United States Patent [19]

Wade et al.

[11] Patent Number: 5,118,449

[45] Date of Patent: Jun. 2, 1992

[54] METHOD OF AND APPARATUS FOR CARTRIDGE TRAY SEALING

[75] Inventors: Maurice Wade; Fred Steward, both of Uxbridge, Canada

[73] Assignee: Glitsch, Inc., Dallas, Tex.

[21] Appl. No.: 699,156

[22] Filed: May 13, 1991

[51] Int. Cl.$^5$ .............................................. B01F 3/04
[52] U.S. Cl. .............................. 261/114.1; 261/114.5
[58] Field of Search .......................... 261/114.1, 114.5

[56] References Cited

U.S. PATENT DOCUMENTS

| | | | |
|---|---|---|---|
| 1,667,136 | 4/1928 | Alexander | 261/114.1 |
| 2,544,614 | 3/1951 | Rapisarda | 261/114.5 |
| 2,582,826 | 1/1952 | Glitsch . | |
| 2,611,596 | 9/1952 | Glitsch . | |
| 2,710,678 | 6/1955 | Rapisarda . | |
| 2,841,421 | 7/1958 | Heere | 261/114.1 |
| 2,889,018 | 6/1959 | Swan | 261/114.1 |
| 3,008,553 | 11/1961 | Glitsch et al. . | |
| 3,013,782 | 12/1961 | Glitsch . | |
| 3,019,003 | 1/1962 | Glitsch . | |
| 3,037,754 | 6/1962 | Glitsch . | |
| 3,079,134 | 2/1963 | Winn . | |
| 3,080,155 | 3/1963 | Glitsch et al. . | |
| 3,087,711 | 4/1963 | Glitsch . | |
| 3,094,575 | 6/1963 | Peterson | 261/114.1 |
| 3,168,600 | 2/1965 | Martin | 261/114.1 |
| 3,233,708 | 2/1966 | Glitsch . | |
| 3,343,821 | 9/1967 | Winn et al. . | |
| 3,410,540 | 11/1968 | Bruckert . | |
| 3,928,513 | 12/1975 | Leva . | |
| 3,959,419 | 5/1976 | Kitterman . | |
| 3,969,447 | 7/1976 | Glitsch et al. . | |
| 4,055,610 | 10/1977 | Leva et al. . | |
| 4,075,298 | 2/1978 | Leva et al. . | |
| 4,086,307 | 4/1978 | Glaspie . | |
| 4,120,919 | 10/1978 | McClain . | |
| 4,123,008 | 10/1978 | McClain . | |
| 4,198,002 | 4/1980 | McClain . | |
| 4,255,363 | 3/1981 | Geiger et al. | 261/114.5 |
| 4,597,916 | 7/1986 | Chen . | |
| 4,604,247 | 8/1986 | Chen et al. . | |
| 4,729,857 | 3/1988 | Lee et al. . | |
| 4,842,778 | 6/1989 | Chen et al. . | |
| 4,909,967 | 3/1990 | Binkley et al. . | |
| 4,950,430 | 8/1990 | Chen et al. . | |
| 4,956,127 | 9/1990 | Binkley et al. . | |

OTHER PUBLICATIONS

G. K. Chen, "Packed Column Internals," Chemical Engineering, Mar. 5, 1984 (Reprint).

*Primary Examiner*—Tim Miles
*Attorney, Agent, or Firm*—Johnson & Gibbs

[57] ABSTRACT

A cartridge tray seal for a chemical process tower. The seal includes a teflon impregnated fiberglass member which presents a generally flaccid sealing element. The member is folded within a generally u-shaped channel positioned around the perimeter of the cartridge tray. A securing strap is positioned within the u-shaped channel to sandwich the fiberglass material therein in a configuration for presenting a pair of outwardly extending sealing lips for engagement against the shell wall. This double pliable seal is able to accommodate shell wall deformations and out-of-round conditions which would ordinarily result in liquid and/or vapor leakage around the cartridge tray.

16 Claims, 2 Drawing Sheets

METHOD OF AND APPARATUS FOR CARTRIDGE TRAY SEALING

BACKGROUND OF THE INVENTION

1. Field of the Invention

The present invention relates to chemical process towers and, more particularly, to a method of and apparatus for cartridge tray sealing for chemical process towers.

2. History of the Prior Art

Distillation columns are utilized to separate selected components from a multi-component stream. Generally, such gas-liquid contact columns utilize either cartridge trays, packings or combinations thereof. In recent years the trend has been to replace the so-called "bubble caps" by sieve and valve trays in most trayed column designs, and the popularity of packed columns, either random (dumped) or structured packings has been utilized in combination with the trays in order to effect improved separation of the components in the stream.

Successful fractionation in the column is dependent upon intimate contact between liquid and vapor phases. Some vapor and liquid contact devices, such as trays, are characterized by relatively high pressure drop and relatively high liquid hold-up. Another type of vapor and liquid contact apparatus, namely structured high efficiency packing, has also become popular for certain applications. Such packing is energy efficient because it has low pressure drop and low liquid hold-up. However, these very properties at times make columns equipped with structured packing difficult to operate in a stable, consistent manner. Moreover, many applications simply require the use of trays.

When cartridge trays are the predominant column contacting devices, there is little need to be concerned about vapor distribution because pressure drop across the trayed column is high. For trayed towers with approximately 50 trays, a pressure drop on the order of 6 PSI (300 mmHg) is common in the prior art. This is, however, more than an order of magnitude greater than the kinetic energy generated by the incoming vapor. The velocity head of vapor entering the distillation column is often greater than 3 to 4 inches of water in refinery heavy oil fractionators whereas the velocity head is no more than 5 mm in chemical or gas treating columns. It is true, however, that when the trays of a 50 tray tower are replaced by packing, the pressure drop through the column is typically reduced by a full order of magnitude, to with on the order of 30 mmHg. This is especially true of structured packing such as that set forth and described in U.S. Pat. No. 4,604,247 assigned to the assignee of the present invention. If the kinetic energy of the feed vapor is kept at 10 mm or more, severe mal-distribution may occur.

Cartridge trays or distillation trays may be assembled in bundles of up to 15 or more trays in a tower. The bundles are inserted into the towers ranging in size from 6" to 36" in diameter. To seal the trays against vapor and liquid bypass, cartridge trays are designed with an edge seal on each tray. This sealing technique is extremely important in the design and operation of the tower. The basic theory of a distillation tray is to maintain a liquid level on the tray and allow the vapor to pass through an open area on the tray and through the liquid disposed thereabove. At the same time, the liquid is allowed to flow across the tray into a downcomer for passage to the tray below. This action is controlled by the design of the hole area in the tray floor. Hole area is calculated to maintain a certain vapor velocity and to achieve the proper vapor-liquid interaction. However, if leakage of liquid or bypassing of vapor occurs at the edge of the tray, the design conditions will be altered and the tray will not operate in accordance with the specification. For this reason the design and manufacture of the trays has received considerable attention.

The fabrication and assembly of cartridge tray tower shells are subject to a number of tolerance problems. For example, shells that are fabricated from rolled and welded plates formed into a round shell are affeoted by the heat of welding. When rolled and welded methods of fabrication are used, shell size and tolerance variations occur in the diameter and velocity at the shell flanges and nozzle locations as well as along the axial and circumferntial weld seams. In addition to the problems recited above, the irregularities in the shell surface may restrict movements of prior art tray sealing designs making it difficult or impossible to insert a tray bundle into a tower region where the deformation has occurred A particularly effective cartridge tray design for process columns is the sieve tray. This tray is constructed with a large number of elongate apertures formed in the bottom surface. The apertures permit the ascending vapor to flow into direct engagement with the liquid that is flowing across the tray. When there is sufficient vapor flow upwardly through the tray, the liquid is prevented from running downwardly through the apertures (referred to as "weeping"). A small degree of weeping is normal in trays, while a larger degree of weeping is detrimental to the capacity and efficiency of a tray. A further discussion of cartridge trays and related aspects of process column operations may also be seen in U.S. Pat. No. 4,956,127, assigned to the assignee of the present invention.

In the assembly stage, the cartridge trays are generally placed in the process column atop support rings. The support rings are generally welded or otherwise permanently secured to the inside surface of the tower and provide mechanical support for the cartridge tray. The issue of sealing the cartridge tray to the column walls and/or the underlying support ring is always a consideration. Prior art approaches have included expandable metal rings which engage the cylindrical walls of the process column. However, out-of-round problems as well as manufacturing tolerance variations often prevent a uniform sealing therearound. It has also been observed that welding along the tower wall in conjunction with construction of tower internals often causes thermal deformation of the tower walls which further exacerbates the out-of-round condition. The utilization of inflexible sealing members against such a tower wall thus generates a myriad of sealing problems. To accommodate for out-of-round regions, more flexible sealing members have been proposed. In the main, the sealing members comprise gaskets and the like which elastically deform to accommodate shape variations. Unfortunately many of the materials for which the flexible gaskets are fabricated find the tower environment to be extremely hostile, and gasket deterioration is commonplace. For this reason, improved sealing member designs have included rings which have a higher degree of flexibility and many accommodate hostile environments. One such ring is set forth and shown in U.S. Pat. No. 4,255,363 wherein a ring is made from polytetrafluoroethylene (PTFE). In that prior art reference it is seen that the PTFE ring is assembled with means for adjusting the pressure of the seal against the tower wall and to accommodate for more effective sealing. Yet even the degree of flexibility afforded by PTFE or other synthetic fluorine material, in and of itself, may not always be sufficient for certain tolerance variations in the tower wall that could be accommodated by more flaccid structures. It would be an advantage, therefore, to overcome the problems of the prior art by providing a reliable, flexible seal that could accommodate both wise tolerance variations and the hostile environment of a chemical process tower.

The present invention provides such an advancement over the prior art by utilizing a teflon impregnated fiberglass gasket of generally flexible construction. The gasket is secured to the cartridge tray ring and presents a double lip outwardly thereof adapted for engaging the process tower wall. The lips are presented in an upwardly deflected orientation for providing a flexible sealing surface against the tower wall and permitting the build-up of liquid pressure thereagainst while preventing the passage of liquid and vapor therethrough and around the cartridge tray perimeter.

SUMMARY OF THE INVENTION

The present invention relates to sealing members for cartridge trays of chemical process towers. More particularly, one aspect of the present invention includes a teflon impregnated fiberglass gasket of generally flaccid construction secured to the outer perimeter of a cartridge tray. The tray is disposed within a column with the outwardly facing lips of the gasket deformed upwardly against the inside walls of the tower.

In another aspect, the invention includes a method and apparatus for sealing the perimeter of a cartridge tray utilizing a double, pliable seal. The seal material may be supplied as teflon impregnated fiberglass tape, although any pliable material that would be compatible with the process chemicals and temperature conditions within the tower would be suitable. In this sealing method, the fiberglass tape is contained in a channel by a metal retainer band and the edges of the tape extend beyond the edge of the tray to allow the tape to deflect up and out against the tower wall. This arrangement allows the tape seal to conform to irregularities of the tower shell and maintain a seal therein. The arrangement also allows more clearance between the edge of the tray and the tower wall which allows the tray bundle to bypass restrictions and variations in the shell.

In yet another aspect, the invention includes an improved cartridge tray seal for a chemical process tower of the type wherein a cartridge tray is disposed within a tower shell for the passage of vapor and liquid thereacross. The improvement comprises the cartridge tray housing a peripheral sealing section adapted for abutting engagement with the shell, the sealing region including a flaccid member impregnated with material for resisting the liquid and vapor within the process tower. Means are provided for securing the flaccid member about the sealing region for permitting said sealing member to extend outwardly therefrom into engagement with the shell wall. In one embodiment of the invention, the flaccid material is teflon impregnated fiberglass.

In a further aspect, the above described invention includes the sealing region being formed with a generally u-shaped channel adapted for receiving the flaooid material therein. Fastener means are provided for positioning upon the flaccid material and within the channel for the secured engagement of the flaccid material. The securing means may comprise a metallic strap positioned within the u-shaped channel and secured therein against the flaccid material. The flaccid material is provided in a width sufficient to permit its placement within the sealing region with a two sided folded portion extending outwardly therefrom for forming a double lip seal against the shell wall.

In yet a further aspect, the invention includes a method of sealing a cartridge tray within the shell of a chemical process tower comprising steps of providing a flaooid member for positioning within the sealing region of said cartridge tray and impregnating the flaccid member with a material for resisting the chemical effects of the liquid and vapor of the chemical process tower. The flaccid material is secured within the sealing region of the cartridge tray, and the flaccid material is extended outwardly from the sealing region into engagement with the side walls of the shell for the sealed engagement of the tray thereagainst.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Figure 1:
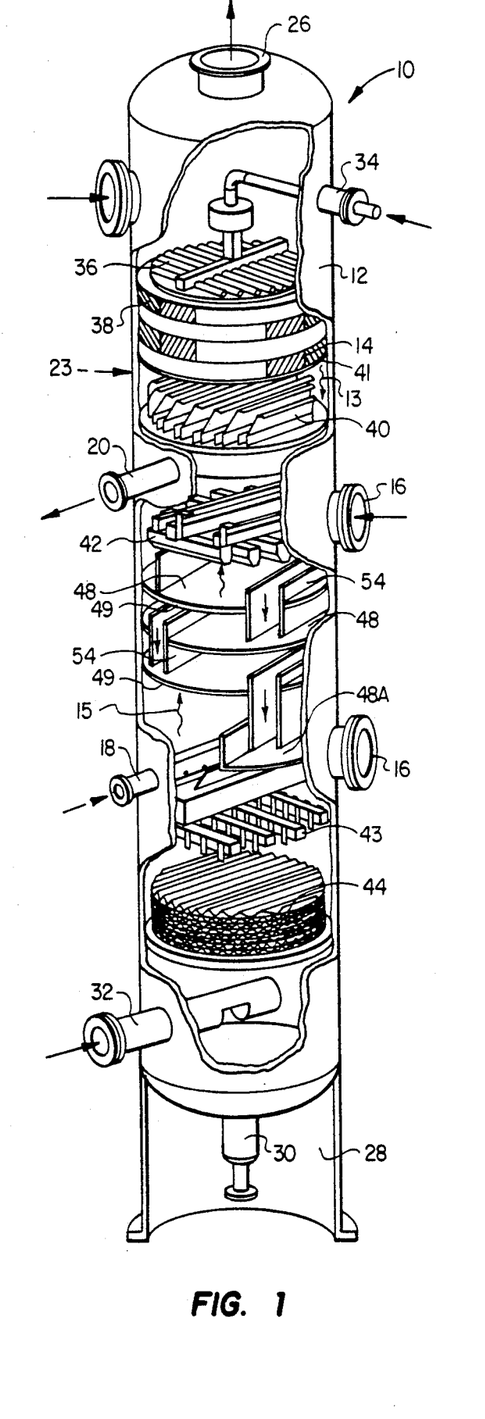
FIG. 1 is a cut-away perspective view of a chemical process tower illustrating the various tower internal configurations thereof.

Referring first to FIG. 1, there is shown a fragmentary, perspective view of an illustrative packed exchange tower or column with various sections out away for showing a variety of tower internals and the utilization of one embodiment of the improved high capacity tray assembly of the present invention. The exchange column 10 of FIG. 1 comprises a cylindrical tower 12 having a plurality of packing bed layers 14 and trays disposed therein. A plurality of manways 16 are likewise constructed for facilitating access to the internal region of the tower 12. Also provided are side stream draw off line 20, liquid side feed line 18, and side stream vapor feed line or reboiler return line 32. A reflux return line 34 is provided atop the tower 10.

In operation, liquid 13 is fed into the tower 10 through reflux return line 34 and side stream feed input feed line 18. The liquid 13 flows downwardly through the tower and ultimately leaves the tower either at side stream draw off 20, or at bottom stream draw off line 30. In its downward flow, the liquid 13 is depleted of some material which evaporates from it as it passes through the trays and packing beds, and is enriched or added to by material which condenses into it out of the vapor stream.

Still referring to FIG. 1, the exchange column 10 is diagrammatically arranged for purposes of clarity. In this illustration, the column 10 includes a vapor outlet in overhead line 26 disposed atop the tower 12 and a lower skirt 28 disposed in the lower region of the tower around bottom stream takeoff line 30 coupled to a reboiler (not shown). Reboiler return conduit 32 is shown disposed above the skirt 28 for recycling vapor therein upwardly through the trays and/or packing layers 14. Reflux from condensers is provided in the upper tower region 23 through entry conduit 34 wherein reflux is distributed throughout a liquid distributor 36 across upper packing bed 38. It may be seen that the upper packing bed 38 is of the structured packing variety. The regions of the exchange column 10 beneath the upper packing bed 38 are shown for the purpose of illustration and include a liquid collector 40 disposed beneath a support grid 41 in support of the upper structured packing 38. A liquid distributor 42, adapted for redistributing liquid 13, is likewise disposed therebeneath. A second liquid distributor array 43 is illustrated below the lowest tray 48A. This particular distributor array may be of the type shown in U.S. Pat. No. 4,909,967, assigned to the assignee of the present invention. Likewise, a lower structured packing bed 44 is shown in the lower tower region.

Referring still to FIG. 1, an array of trays is also shown for purposes of illustration within column 10. In many instances, process columns contain only packing, only trays, or combinations of packing and trays. The present illustration is, however, a combination for purposes of discussion of the overall tower and its operation. A trayed column usually contains a plurality of trays 48 of the type shown herein. In many instances, the trays 48 are valve or sieve trays. Such trays comprise plates which are perforated or slotted in construction. The vapor and the liquid engage at or along the tray and, in some assemblies, are permitted to flow through the same openings in a counter-current flow arrangement. Optimally, the vapor and liquid flows reach a level of stability within the tower 10. With the utilization of downcomers, to be described in more detail below, this stability may be achieved with a relatively low flow rate permitting the ascending vapor to mix with the descending liquid. In some embodiments no downcomers are used and the vapor and the liquid use the same openings, alternating as the respective pressures change.

In the present embodiment, each tray is sealed against the tower wall by a special sealing gasket 49, which will be discussed in detail below. The gasket 49 permits the tray 48 to seal against the tower walls 12 in order to facilitate the counter-current flow conditions existing between the ascending vapor 15 and the descending vapor 13. This flow condition is the subject of a myriad of critical design considerations including the position downcomers 54, liquid/vapor ratios, liquid cooling, liquid flow/back-mixing, foaming (froth), height, froth uniformity and the presence of solids or slurries therein. Reliability and corrosion are likewise considerations in the selection of the various elements in the packed towers. The parameters for material selection in the fabrication of the tower internal are in many instances, the result of such considerations. The anatomy of the packed column, as shown in FIG. 1, is likewise described in more detail in an article by Gilbert Chem, one of the inventors herein, entitled "Packed Column Internals" appearing in the Mar. 5, 1984 edition of Chemical Engineering. inoorporated herein by reference.

Figure 3:
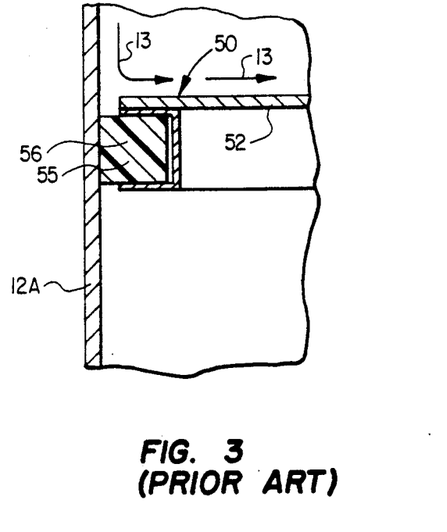
FIG. 3 is an enlarged, side elevational, fragmentary, cross-sectional view of a portion of a prior art cartridge tray and sealing member.

Referring now to FIG. 3, there is shown an enlarged, side elevational, cross-sectional view of a section of a prior art tray disposed within a chemical process tower and rigidly mounted therein. The tray 50 comprises a plurality of tray members 52 disposed between the downcomers 54 shown in FIG. 1. Liquid 13 is shown to flow across each tray during its descending path through the tray array 50. In this particular embodiment, the tray 52 is mounted to the side wall of the tower by a mounting ring 55. The mounting ring 55 includes a box shaped gland member 56 that is circumferentially disposed around the tray in sealed engagement with the tower walls. Such a seal provides a much larger surface area against which vapor or liquid may be sealed. As ascending vapor mixes with the descending liquid, both vapor and liquid are hopefully prevented from bypassing central tray active area by virtue of such sealing members. However, the box shaped gland member 56 does not provide sufficient flexibility to accommodate out-of-round and deformed sections of the tower shell 12A.

Figure 4:
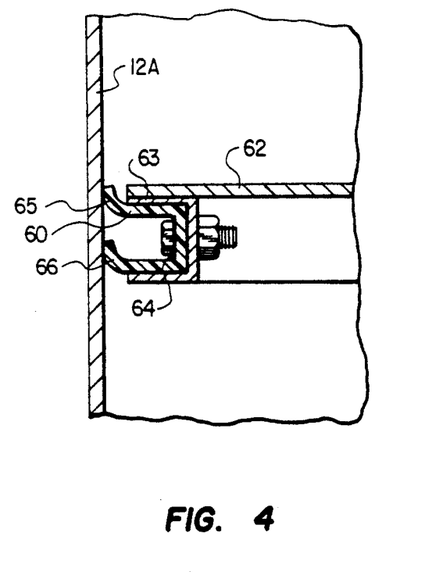
FIG. 4 is an enlarged, side elevational, fragmentary, cross-sectional view of a portion of the cartridge tray and sealing member of FIG. 2.

Referring now to FIG. 4, there is shown an enlarged, side elevational, cross-sectional view of the improved sealing gland 60 of the present invention illustrating the mounting of a tray 62 within a process tower 12. The sealing gland comprises a double, pliable seal. The seal material may be supplied as teflon impregnated fiberglass tape 60, although any pliable material that would be compatible with the process chemicals and temperature conditions within the tower would be suitable. In this sealing method the fiberglass tape 60 is contained in a channel 63 by a metal retainer band 64. Channel 63 is secured beneath the tray 62 along the perimeter thereof. The edges 65 and 66 of the tape 60 extend beyond the edge of the tray to allow the tape 60 to deflect up and out against the tower wall 12A. This arrangement allows the tape edges 65 and 66 to conform to irregularities of the tower shell 12A and maintain a seal thereagainst. It is for this reason that flacoid material is utilized in a width sufficient to provide edges 65 and 66 to engage all deformed and out-of-round regions of the shell 12A. The arrangement also allows more clearance between the edge of the tray and the tower wall 12A which allows the tray bundle 62 to bypass restrictions and variations in the shell. It is of distinct advantage to provide more clearance between the tray and the tower walls afforded by the present invention in view of the costs associated within installation problems.

Figure 2:
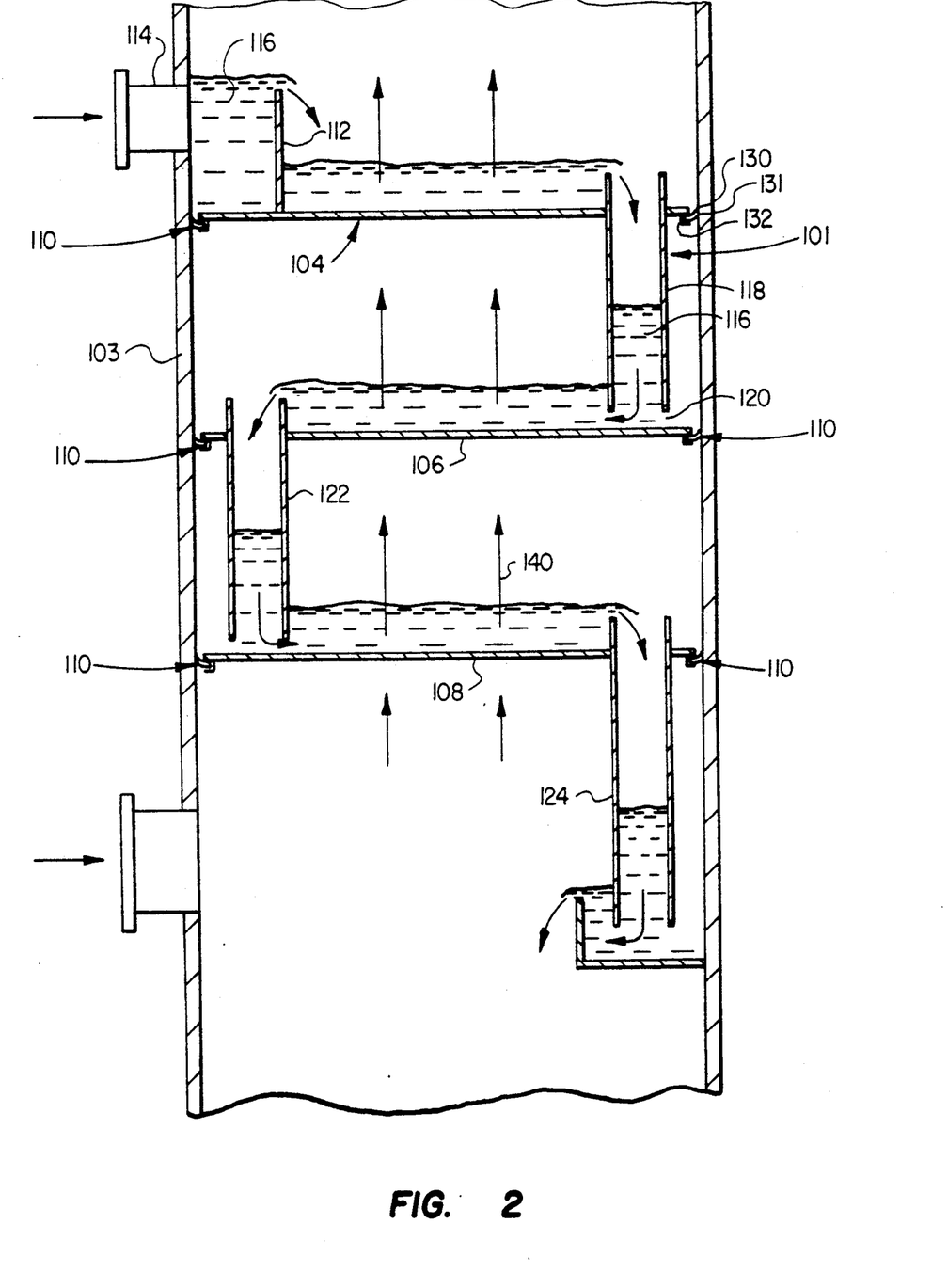
FIG. 2 is an enlarged, side elevational view of the array of chemical process tower cartridge trays of FIG. 1 illustrating the use of sealing members therearound.

Referring now to FIG. 2, there is shown an array of trays 101 installed in a tower shell 103. Upper tray 104 is disposed atop and above intermediate tray 106 which is disposed above lower tray 108. The tray alignment, configuration and the diagrammatioal representation thereof is shown for purposes of illustration only. A myriad of tray designs and configurations may be incorporated in accordance with the principles of the present invention. What is shown are representative trays in conjunction with a sealing gland assembly constructed in accordance with the principles of the present invention and as particularly described relative to FIG. 4. A sealing gland assembly 110 is shown disposed along the perimeter of each of the trays 104, 106 and 108, which assembly provides a means for sealing said cartridge tray against the passage of vapor and liquid thereover and therethrough. In some instances, liquid is disposed above the sealing member, as in the region of a downcorner. For example, upper tray 104 is constructed with a reservoir 112 disposed adjacent liquid input pipe 114. The liquid 116 is allowed to accumulate within the vessel 112 above the sealing member 110 for flowing across the surface of the tray 104. A downcomer 118 is shown on the opposite side of tray 104, which downcomer permits the flow of liquid 116 downwardly toward tray 106. In a lower region of downcomer 118 the liquid 116 is accumulated for discharge in an open region 120 beneath the downcomer 118 wherein liquid is discharged outwardly therefrom for flow across tray 106. A downcomer 122 is likewise disposed on the opposite side of tray 106 for discharging liquid downward to lower tray 108. Finally, a downcomer 124 is shown disposed on the side of tray 108 opposite downcomer 122.

The process column illustrated in FIG. 2 and described above, is shown for purposes of illustration. Each of the cartridge tray sealing members 110 are disposed in a region of the vessel shell 103 that is subject to deformation. As discussed above, the deformation may occur through the initial assembly process wherein welding causes distortion in the generally cylindrical side walls and/or in the process of physical loading. For example, the height of liquid 116 in top tray 104 can cause deformation both in the tray 104 as well as in related structural members. The sealing member 110 must be capable of accommodating surface irregularities between the tray 104 and the shell 103. For this reason, each illustration of the sealing member 110 includes a pair of lip members 130 and 13 disposed outwardly against the shell 103 from tray channel 132. As described above, the channel 132 is secured to the underside of the cartridge tray for housing the teflon impregnated material therein and for the outward extension therefrom to facilitate the sealing as described herein. The sealing also prevents the upward flow of vapor 140 from passing around the trays along the sidewalls of the shell 103. Such passage would bypass the active area of the trays and reduce the efficiency of the column.

Shrinkage of the tower walls may occur through welding as well as physical loading therein. Deformation in the shell can also occur when welding the nozzle to the shell surface, which nozzles are necessary for the function of the tower as shown in FIG. 2. Deformation may occur at the long seam of the tower which is a structural concern in both the fabrication as well as the use of cylindrical towers. As shown herein, the loading of the trays within the tower with the counter current flow of vapor and liquid will impart to the shell both a station and a dynamic load which must be accommodated with appropriate flexibility in the sealing members thereagainst. Since it is well known that welding has a drastic effect upon the metal shell itself and the diameter which may be reduced due to shrinkage at welded circumferntial shell joints, it is necessary for sealing members to have flexibility and accommodation of spaces. It is for this reason that the double contact, pliable cartridge tray edge seal of the present invention provides such a marked advance over prior art configurations. The surface irregularities of the tower shell maybe easily accommodated with the pliable cartridge and the sealing effectiveness enhanced by the double contact afforded therewith.

In operation, the sealing gland of the present invention affords the tray the flexibility of accommodating irregularities in both the tray and the wall of the chemical process column. It is well known that such process column walls are not perfectly cylindrical and various surface irregularities can cause sealing problems with conventional prior art sealing glands. The use of rigid wipers and the like, though successful in accommodating various irregularities, provides a fixed dimensional shape that may often not accommodate said irregularities. The present invention facilitates surface irregularities by utilizing a substantially flaccid member that is sufficiently impregnated with a substance, such as teflon, whereby substantial amounts of both vapor and liquid are prevented from passing therethrough when installed as shown herein. The structural ring of the tray in which the teflon impregnated fabric is mounted provides the overall shape that accommodates the tray-tower installation. In this manner, manufacturers may also reduce the time and expense necessary for precision fabrication of tower internals which are mandated by the requirements for sealing between the trays and the tower walls.

In addition to the initial installation feasibility, the teflon impregnated fabric further provides enhanced reliability by presenting a surface capable of withstanding the hostile chemical environment typically found in such tray installations.

It is thus believed that the operation and construction of the present invention will be apparent from the foregoing description. While the method and apparatus shown or described has been characterized as being preferred, it will be obvious that various changes and modifications may be made therein without departing from the spirit and scope of the invention as defined in the following claims.

What is claimed is:

1. An improved cartridge tray seal for a chemical process tower of the type wherein a cartridge tray is disposed within a tower shell for the passage of vapor and liquid thereacross and therethrough, wherein the improvement comprises said cartridge tray housing a peripheral sealing section adapted for abutting engagement with said shell, said sealing region including a generally flaccid member impregnated with material for resisting the liquid and vapor within said process tower and means for securing said flacoid member about said sealing region for permitting said sealing member to extend outwardly therefrom into engagement with said shell wall.

2. The apparatus as set forth in claim 1 wherein said flacoid material is teflon impregnated fiberglass.

3. The apparatus as set forth in claim 1 wherein said sealing region further includes a generally u-shaped channel adapted for receiving said flaccid material therein and fastener means for positioning upon said flaccid material and within said channel for the secured engagement thereof.

4. The apparatus as set forth in claim 3 wherein said securing means comprises a strap positioned within said u-shaped channel secured therein against said flaccid material.

5. The apparatus as set forth in claim 1 wherein said flaccid material is provided in a width sufficient to permit its placement within said sealing region and a two-sided folded portion extending outwardly therefrom for forming a double lip seal against said shell wall.

6. The apparatus as set forth in claim 5, wherein said sealing region further includes a generally u-shaped channel adapted for receiving said folded, flaccid material therein and fastener means for positioning upon said folded, flaccid material and within said channel for the secured engagement thereof.

7. The apparatus as set forth in claim 6, wherein said securing means comprises a strap positioned within said u-shaped channel secured therein against said folded, flaccid material.

8. The apparatus as set forth in claim 6, wherein said flacoid material is teflon impregnated fiberglass.

9. The apparatus as set forth in claim wherein said generally flaccid member is secured about said sealing region in a configuration forming a double pliable seal.

10. The method of sealing a cartridge tray within the shell of a chemical process tower comprising steps of:
providing a flaccid member for positioning within the sealing region of said cartridge tray;
impregnating said flaccid member with a material for resisting the chemical effects of the liquid and vapor of said chemical process tower;
securing said flaccid material within said sealing region of said cartridge tray; and
extending said flaccid material outwardly from said sealing region into engagement with said side walls of said shell for the sealed engagement of said tray thereagainst.

11. The method as set forth in claim 10 and further including the steps of providing said flaccid material in a sufficient width for extending outwardly from said sealing region and folding said flaccid material relative to said sealing region for extending two surfaces thereof outwardly into engagement with said shell wall.

12. The method as set forth in claim 10 and further including the step of providing said sealing region of said cartridge tray in a generally u-shaped channel adapted for receiving said flacoid member therein in a folded configuration thereagainst and extending to surfaces thereof outwardly from said sealing region for engagement into said shell wall.

13. The method as set forth in claim 10 wherein said step of impregnating said flaooid member includes the steps of providing a fiberglass sheet and impregnating said fiberglass with teflon for resisting the chemical effects of the liquid and vapor in a chemical process tower.

14. The method as set forth in claim 13 and further including the step of providing said sealing region of said cartridge tray in a general u-shaped channel adapted for receiving said fiberglass member therein is a folded configuration thereagainst, providing a strap for position upon said folded fiberglass within said channel and securing said strap to said channel with said folded fiberglass sandwiched therebetween.

15. An improved cartridge tray seal for a chemical process tower of the type wherein a cartridge tray is disposed within a tower shell for the passage of vapor and liquid thereacross and therethrough, wherein the improvement comprises;
said cartridge tray housing a peripheral sealing section comprising a generally U-shaped channel adapted for abutting engagement with said shell;
said sealing region including a generally flaooid member impregnated with material for resisting the liquid and vapor within said process tower;
fastener means for positioning upon said flaccid material and within said channel for the secured engagement thereof for securing said flaccid member about said sealing region and permitting said sealing member to extend outwardly therefrom into engagement with said shell wall;
said flaccid material comprising teflon impregnated fiberglass; and
said fiberglass being provided in a width sufficient to permit its folded placement within said sealing region with two sides thereof extending outwardly therefrom for forming a double lip seal against said shell wall.

16. The method of sealing a cartridge tray within the shell of a chemical process tower comprising steps of:
providing a flacoid member for positioning within the sealing region of said cartridge tray;
impregnating said flaccid member with a material for resisting the chemical effects of the liquid and vapor of said chemical process tower;
cutting said flaccid material in a width sufficient for extending outwardly from said sealing region when secured therein;
folding said flaccid material relative to said sealing region for extending two surfaces thereof outwardly into engagement with said shell wall;
securing said flaccid material within said sealing region of said cartridge tray; and
extending said two surfaces of said flaccid material outwardly from said sealing region into engagement with said side walls of said shell for the sealed engagement of said tray thereagainst.

* * * * *

UNITED STATES PATENT AND TRADEMARK OFFICE
CERTIFICATE OF CORRECTION

PATENT NO. : 5,118,449

DATED : JUNE 2, 1992

INVENTOR(S) : Maurice Wade, Fred Steward

It is certified that error appears in the above-identified patent and that said Letters Patent is hereby corrected as shown below:

| | |
|---|---|
| Column 1, line 51 | Delete "with" <br> Insert --wit:-- |
| Column 2, line 13 | Delete "affeoted" <br> Insert --affected-- |
| Column 2, line 16 | Delete "velocity" <br> Insert --ovality-- |
| Column 2, line 18 | Delete "circumferntial" <br> Insert --circumferential-- |
| Column 2, line 66 | Delete "many" <br> Insert --may-- |
| Column 3, line 68 | Delete "flaooid" <br> Insert --flaccid-- |
| Column 4, line 14 | Delete "flaooid" <br> Insert --flaccid-- |
| Column 4, line 47 | Delete "out" <br> Insert --cut-- |
| Column 5, line 67 | Delete "one" |
| Column 5, line 68 | Delete "of the inventors herein" |
| Column 6, line 1 | Delete "Chemical" <br> Insert --<u>Chemical</u>-- |
| Column 6, line 2 | Delete "Engineering" <br> Insert --<u>Engineering</u>-- |

UNITED STATES PATENT AND TRADEMARK OFFICE
CERTIFICATE OF CORRECTION

PATENT NO. : 5,118,449

DATED : June 2, 1992

Page 2 of 3

INVENTOR(S) : Maurice Wade, Fred Steward

It is certified that error appears in the above-identified patent and that said Letters Patent is hereby corrected as shown below:

| | |
|---|---|
| Column 6, line 2 | Delete "inooperated" <br> Insert --incorporated-- |
| Column 6, line 41 | Delete "flacoid" <br> Insert --flaccid-- |
| Column 6, line 55 | Delete "Diagrammatioal" <br> Insert --Diagrammatical-- |
| Column 7, line 31 | Delete "13" <br> Insert --131-- |
| Column 7, line 57 | Delete "circumferntial" <br> Insert --circumferential-- |
| Column 8, line 44 | Delete "flacoid" <br> Insert --flaccid-- |
| Column 8, line 49 | Delete "flacoid" <br> Insert --flaccid-- |
| Column 9, line 8 | Delete "flacoid" <br> Insert --flaccid-- |
| Column 9, line 34 | Delete "flacoid" <br> Insert --flaccid-- |
| Column 9, line 39 | Delete "flaooid" <br> Insert --flaccid-- |
| Column 9, line 47 | Delete "is" <br> Insert --in-- |

UNITED STATES PATENT AND TRADEMARK OFFICE
CERTIFICATE OF CORRECTION

PATENT NO. : 5,118,449
DATED : June 2, 1992
INVENTOR(S) : Maurice Wade, Fred Steward It is certified that error appears in the above-identified patent and that said Letters Patent is hereby corrected as shown below:

Column 10, line 12        Delete "flaooid"
                                        Insert --flaccid--

Signed and Sealed this

Twenty-fourth Day of August, 1993

Attest:

BRUCE LEHMAN

*Attesting Officer*        *Commissioner of Patents and Trademarks*